United States Patent Office 2,786,843
Patented Mar. 26, 1957

2,786,843

TETRADEHYDRO RESERPIC ACID AND ESTERS THEREOF

Charles Ferdinand Huebner, Chatham, N. J., assignor to Ciba Pharmaceutical Products, Inc., Summit, N. J., a corporation of New Jersey No Drawing. Application April 7, 1955, Serial No. 500,046

14 Claims. (Cl. 260—287)

This invention is for new pentacyclic quaternary ammonium compounds related to reserpic acid and the process for the preparation thereof.

According to my investigations reserpic acid or esters thereof, which are described in copending application Serial No. 376,984, filed August 27, 1953, of Emil Schlittler, give on treatment with certain dehydrogenating agents disclosed below a new acid or the corresponding esters which contain four hydrogen atoms less than the starting materials. To the new acid I have therefore assigned the name tetradehydroreserpic acid. In accordance with my investigations tetradehydroreserpic acid can be represented by the formula:

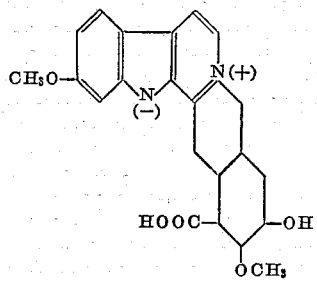

Thus my invention relates to tetradehydroreserpic acid and the esters thereof in which at least one of the two ester-forming groups is esterified; it comprises more especially those esters in which the carboxyl group is esterified with an aliphatic alcohol, for example lower alkanol, and the hydroxyl group is free or esterified with an aliphatic, araliphatic, aromatic or heterocyclic carboxylic acid.

Besides tetradehydroreserpic acid and methyl tetradehydroreserpate, the invention relates most particularly to tetradehydroreserpine of the formula:

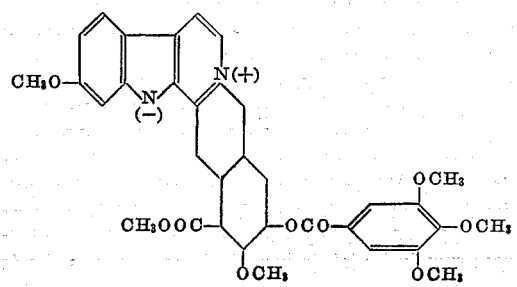

and its quaternary salts, which are represented by the formula:

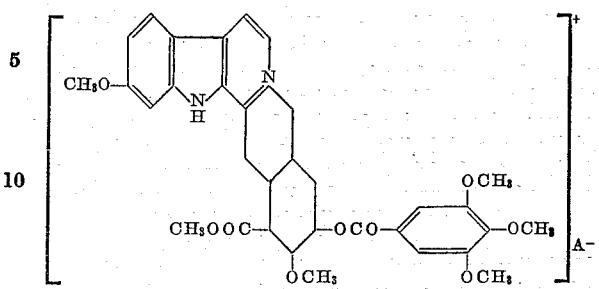

wherein A⁻ stands for an anion.

The new compounds have valuable properties. Thus, they absorb U. V.-light of wave length between 290 and 320 mµ and can thus be used for the prevention of sunburn as active ingredients in sun screens. The new compounds are also valuable as intermediates for the synthesis of compounds having related structure, which can be used as medicaments or active ingredients of sun screen compositions. Thus by reduction with sodium borohydride the tetradehydro-compounds are reduced to the corresponding compounds of the 3-iso-reserpine series, as disclosed in my copending application Case SU-105, filed on even date herewith.

The process for the manufacture of the new compounds comprises dehydrogenating reserpic acid or its esters or the corresponding 3-iso-compounds, described in my aforesaid copending application by treating them with dehydrogenating agents capable of transforming compounds having the yohimbine ring structure into the corresponding py-tetradehydro-compounds, for example yohimbine into py-tetradehydro-yohimbine. Such agents are especially lead tetraacylates, such as lead tetraacetate, lead dioxide in acetic acid or maleic acid in the presence of palladium black, or furthermore oxygen in acetic acid in the presence of a platinum catalyst, and more generally oxidation agents having a potential of about —1.7 volts or higher and being otherwise appropriate for the dehydrogenation of the above mentioned compounds. The preferred method for the dehydrogenation of reserpates consists in using lead tetraacetate in acetic acid, and it is of advantage to avoid an excess of the oxidizing agent; the free acids are advantageously dehydrogenated catalytically, for example using maleic acid in the presence of palladium black.

Depending on the working conditions employed, the new compounds are obtained in the form of the free anhydronium bases or the quaternary salts. From the salts the free bases can be obtained in the usual manner; the anhydronium bases can be converted into their salts, for example those with organic or inorganic acids, such as hydrohalic acids, sulfuric acid, phosphoric acid, nitric acid, hydroxyethane sulfonic acid, toluene sulfonic acid, acetic acid, tartaric acid, oxalic acid or citric acid and the like, for example by treating the bases with the corresponding acids. Free acids may be converted into their salts with bases, for example metal salts. Esters can be converted, for example by hydrolysis, preferably under basic conditions, or by alcoholysis, as the case may be into the corresponding partially or completely hydrolyzed compounds, for example tetradehydroreserpic acid esters having a free hydroxyl group or tetradehydroreserpic acid. The free acid may be converted into its esters having a free hydroxyl group by treating it with an esterifying agent capable of converting a carboxyl group into an esterified carboxyl group. To this end the acid can be converted into an ester thereof directly or by way of a functional derivative thereof. Advantageously, the acid is reacted with a diazoalkane, or it is esterified with an alcohol, especially an alkanol in the presence of a strong acid such as a hydrohalic acid. To convert an ester of tetradehydroreserpic acid having a free hydroxyl group into an ester of tetradehydroreserpic acid in which both functional groups are esterified, the ester of tetradehydroreserpic acid having a free hydroxyl group is treated with an esterifying agent capable of converting a hydroxyl group into an esterified hydroxyl group. One procedure is to react the ester having a free hydroxyl group with the desired acid advantageously in the form of a reactive functional derivative thereof, especially an acyl halide, such as for example the acyl chloride or anhydride. The reaction is advantageously conducted in the presence of a diluent and/or a condensing agent. When an acid halide is used it is advantageous to work in an anhydrous solvent in the presence of an acid-binding agent such as an alkali carbonate or alkaline earth carbonate or a strong organic base such as a tertiary amine. There may be used, e. g. an acid halide in pyridine as a solvent. The above outlined subsequent reactions may be carried out optionally and in any desired order.

The invention also embraces a process, wherein the starting materials are used in the form of their salts and/or the final products are obtained in the form of their salts, and, furthermore, any modification thereof, wherein a compound obtainable as an intermediate in any stage of the process of the invention is used as starting material and the remaining steps are carried out.

The new compounds, especially tetradehydroreserpine and its salts, can be made up into sun screen compositions according to the customary methods employed in making such preparations. Preferably they may be incorporated into a hydrophilic ointment which contains, for example, glycols such as propylene glycol, higher aliphatic alcohols such as stearyl alcohol, white petrolatum, distilled water and the like. More conveniently, the new compounds are used in the form of their salts such as tetradehydroreserpine hydrochloride, which can also be used in the form of applicable solutions, for example in 70 percent alcohol. The mentioned sun screen compositions have preferably a content of 3–5 percent of the new active compounds.

The following examples will serve to illustrate the invention, the relationship of parts by weight to parts by volume being the same as the gram to the milliliter, and the temperatures being given in degrees centigrade.

*Example 1*

To a stirred solution of 1 part by weight of reserpine in 25 parts by volume of acetic acid held at 25° is added slowly 55 parts by volume of a 0.063 M lead tetraacetate solution in acetic acid.

The addition is at such a rate that the oxidant is never in large excess. Upon completion of the reaction the lead tetraacetate is completely consumed. Most of the acetic acid is then removed by distillation in vacuo. Water is then added followed by chloroform. 50 percent aqueous sodium hydroxide solution is added with agitation and cooling till the aqueous phase is just basic (pH 9–10). The chloroform phase is then separated and washed with water. Enough 8 N ethanolic hydrogen chloride is added to the chloroform solution to bring the pH to 3. The chloroform solution is evaporated in vacuo to dryness. The residue is dissolved in boiling water and filtered hot. On addition of 6 N hydrochloric acid, tetradehydroreserpine hydrochloride crystallizes. It melts at 200–205° with decomposition. Tetradehydroreserpine hydrochloride may be hydrolyzed or alcoholyzed to yield methyl tetradehydroreserpate, which can be further hydrolyzed to tetradehydroreserpic acid, the hydrochloride of which melts at 260–261°.

*Example 2*

To a stirred solution of 1 part by weight of methyl reserpate in 25 parts by volume of acetic acid held at 25° is added slowly 104 parts by volume of a 0.048 M lead tetraacetate solution in acetic acid. The reaction is carried out as described in Example 1 and the product worked up in the identical manner. Evaporation of the chloroform solution which has been acidified with methanolic hydrogenchloride yields methyl tetradehydroreserpate hydrochloride as a non-crystalline powder. The free base can be esterified by treatment with 3,4,5-trimethoxybenzoyl chloride in pyridine to yield tetradehydroreserpine described in Example 1.

*Example 3*

A mixture of 1 part by weight of reserpic acid hydrochloride, 2 parts by weight of maleic acid and 0.1 part by weight of palladium black in 20 parts by volume of water is refluxed for four hours. The solution is filtered hot to remove the catalyst, treated with 3 parts by volume of concentrated hydrochloric acid and allowed to cool. A mixture of the desired compound and fumaric acid separating is filtered and washed with 100 parts by volume of ether to remove the fumaric acid. The insoluble residue is recrystallized from water containing excess hydrochloric acid to yield needles of tetradehydroreserpic acid hydrochloride, M. P. 260–261°; $\lambda$ max=253 m$\mu$ (log $\epsilon$=4.52), 329 m$\mu$ (log $\epsilon$=4.32). It can be esterified with diazomethane to yield the hydrochloride of methyl tetradehydro reserpate described in Example 2.

*Example 4*

To a stirred solution of 1 g. of 3-iso-reserpine in 25 ml. of acetic acid held in 25° is added slowly and with external cooling, 55 ml. of a 0.063 M lead tetraacetate solution in acetic acid.

The addition is at such a rate that the oxidant is never in large excess. Upon completion of the reaction the lead tetraacetate is completely consumed. Most of the acetic acid is then removed by distillation in vacuo. Water is then added followed by chloroform. 50 percent aqueous sodium hydroxide solution is added with agitation and cooling till the aqueous phase is just basic (pH 9–10). The chloroform phase is then separated and washed with water. Enough 8 N ethanolic hydrogen chloride is added to the chloroform solution to bring the pH to 3. The chloroform solution is evaporated in vacuo to dryness. The residue is dissolved in boiling water and filtered hot. On addition of 6 N hydrochloric acid, tetradehydroreserpine hydrochloride crystallizes. It melts at 200–205° with decomposition.

*Example 5*

In the same manner as indicated in Examples 1–3, 3-iso-reserpic acid, methyl 3-iso-reserpate or 3-iso-reserpine respectively can be dehydrogenated to yield the tetradehydro compounds described in Examples 1–3.

The iso-compounds used as starting materials can be obtained as follows:

3 g. of methyl reserpate are refluxed in 20 ml. of collidine containing 200 mg. of p-toluenesulfonic acid for 4 hours. The reaction mixture is cooled, gently shaken with dilute ammonium hydroxide to remove the acid catalyst, and the collidine distilled in vacuo to a small volume. 50 ml. of water are added and the solvents completely removed by distillation. The dark brown syrup resulting is dissolved in 30 ml. of ethanol and made acid (pH 3) by the careful addition of 5 N aqueous nitric acid. Scratching and cooling causes the separation of methyl 3-iso-reserpate nitrate which after standing overnight is collected. It crystallizes from water and melts then at 265–270°. It analyzes for the formula $C_{23}H_{31}N_3O_8$.

It can be converted to the base by addition of ammonium hydroxide to its hot aqueous solution. Recrystallization from methanol-water yields methyl 3-iso-reserpate melting at 220–221°, $[\alpha]_D^{25}=-62°$ (ethanol). Its infrared spectrum in Nujol (mineral oil) mull shows the following very strong to strong bands given in reciprocal centimeters: 1738, 1631, 1501, 1463, 1378, 1369, 1345, 1313, 1276, 1267, 1243, 1200, 1158, 1114, 1088, 1037, 997, 831, 807.

5 g. of reserpine are refluxed in 50 ml. of acetic anhydride for 18 hours. About 40 ml. anhydride are distilled off in vacuo and the remainder decomposed by the addition of ice. Ammonia is added and the crude base extracted with chloroform. The dark syrupy residue remaining after removal of the chloroform is dissolved in about 5 ml. of ethanol and carefully acidified with 5 N aqueous nitric acid. 3-iso-reserpine soon separates as the crystalline nitrate. This is filtered, washed with ethanol and converted to the base by shaking with chloroform in the presence of excess N aqueous sodium hydroxide. The chloroform solution is washed with water, dried over sodium sulfate and the solvent evaporated. The light yellow syrupy residue crystallizes on scratching in the presence of a few ml. of ethanol. The solid is filtered and recrystallized from ethanol-water to yield 3-iso-reserpine which melts at 150–155° with frothing, $[\alpha]_D^{24}=-164°$ (chloroform). Its infrared spectrum in Nujol (mineral oil) mull shows the following very strong to strong bands given in reciprocal centimeters: 1743, 1718(+4), 1630, 1596, 1507, 1463, 1418, 1379, 1335, 1274, 1227, 1161, 1123, 1003, 981, 802, 760. 3-iso-reserpine is readily distinguishable from reserpine by its low melting point and high solubility in acetone.

3-iso-reserpic acid nitrate can be obtained by hydrolysis of methyl 3-iso-reserpate with alcoholic potassium hydroxide, removal of the alcohol by distillation and acidification with nitric acid. On recrystallization from water it melts at 266–270° and analyzes for the formula $C_{22}H_{29}N_3O_8 \cdot H_2O$.

What is claimed is:

1. A member of the group consisting of compounds having the general formula:

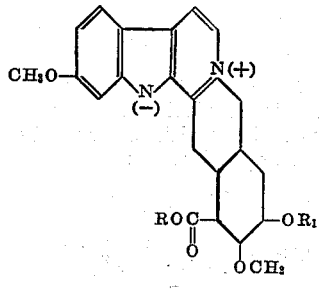

wherein R is a member of the group consisting of hydrogen and lower alkyl radicals and $R_1$ is a member of the group consisting of hydrogen, lower alkanoyl and lower alkoxy-benzoyl radicals, and the acid addition salts thereof.

2. The new compound tetradehydroreserpic acid having the formula:

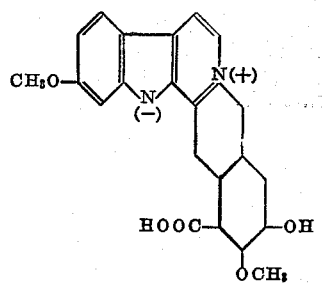

3. The new compound methyl tetradehydroreserpate having the formula:

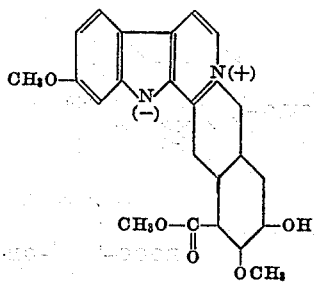

4. The new compound tetradehydroreserpine having the formula:

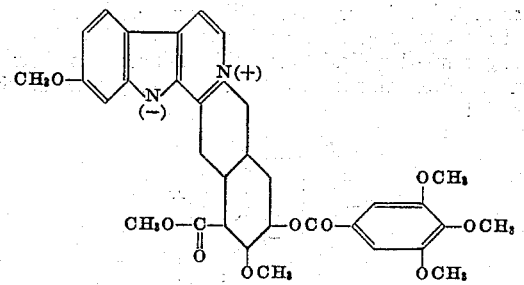

5. The acid addition salts of the compound of claim 3.
6. The hydrochloride of the compound of claim 3.
7. The acid addition salts of the compound of claim 4.
8. The hydrochloride of the compound of claim 4.
9. A process which comprises treating a compound of the group consisting of:

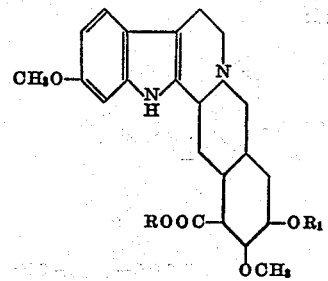

wherein R is a member of the group consisting of hydrogen and lower alkyl radicals, and $R_1$ is a member of the group consisting of hydrogen, lower alkanoyl and lower alkoxy benzoyl radicals and acid addition salts thereof with a dehydrogenating agent selected from the group consisting of lead tetraacetate, lead dioxide in the presence of acetic acid, maleic acid in the presence of palladium black, and oxygen in acetic acid in the presence of platinum catalyst, to obtain the corresponding tetradehydro compound.

10. A process which comprises treating the compound:

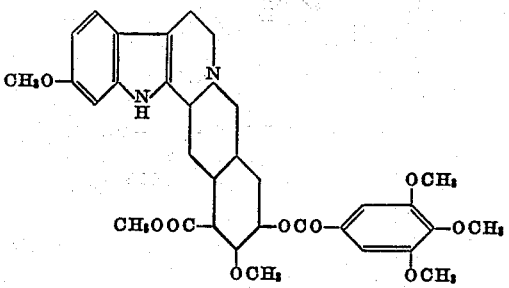

with lead tetraacetate to obtain the corresponding tetradehydro compound.

11. A process which comprises alcoholyzing a compound of the group consisting of:

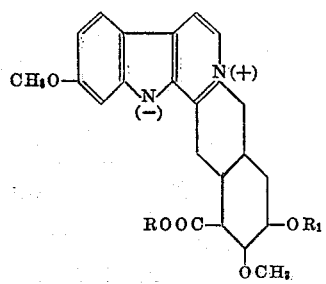

wherein R is a lower alkyl radical and R₁ is a member of the group consisting of lower alkanoyl and lower alkoxy benzoyl radicals and acid addition salts thereof, with a lower alkanol to obtain a compound of the formula:

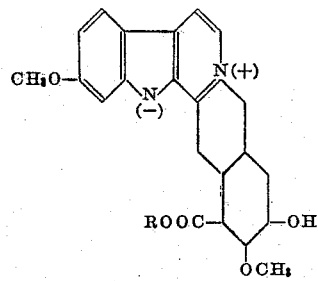

wherein R has the value defined above.

12. A process which comprises the step of treating the compound:

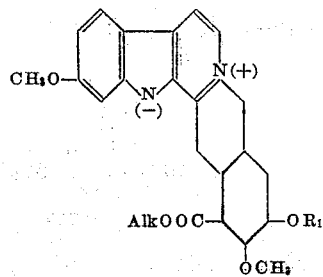

wherein Alk represents a lower alkyl radical and R₁ represents a lower alkoxy benzoyl radical, with an alkali metal hydroxide to obtain a compound of the formula:

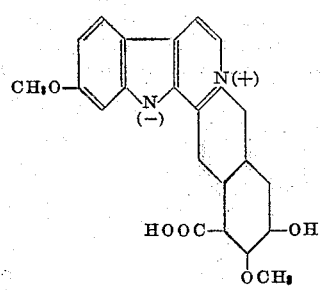

13. A process which comprises treating the compound:

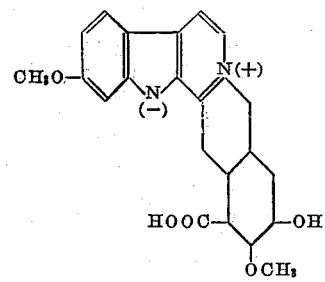

with a lower diazoalkane to obtain a compound of the formula:

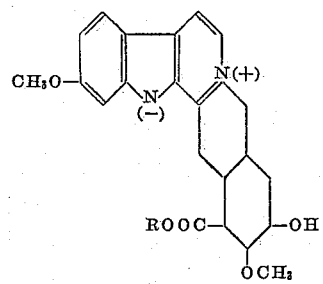

wherein R is a lower alkyl radical.

14. A process for preparing a compound of the formula:

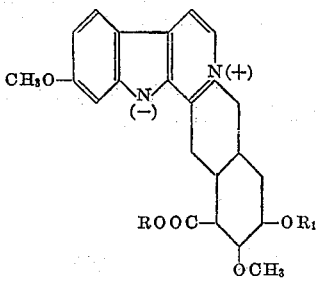

wherein R is a lower alkyl radical and R₁ is a lower alkoxy benzoyl radical which comprises the step of treating a compound of the formula:

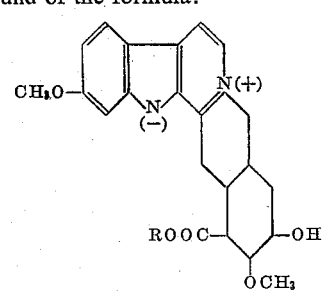

wherein R has the value defined above with a member of the group consisting of an acid anhydride and an acid chloride of a lower alkoxy benzoic acid.

References Cited in the file of this patent

Helv. Chim. Acta., vol. 37, pages 59–75 (1954).
Angew. Chem., vol. 66, 1954, pages 386–390.
Whitmore, Organic Chemistry, 2nd. ed. 1951, D. Van Nostrand Co., N. Y.